United States Patent
Hoff et al.

(10) Patent No.: US 12,420,227 B2
(45) Date of Patent: Sep. 23, 2025

(54) AQUEOUS CO2 ABSORBENT COMPRISING 2-AMINO-2-METHYL-1-PROPANOL AND 3-AMINOPROPANOL

(71) Applicant: Aker Carbon Capture Norway AS, Lysaker (NO)

(72) Inventors: Karl Anders Hoff, Trondheim (NO); Thor Mejdell, Trondheim (NO); Inna Kim, Trondheim (NO); Andreas Grimstvedt, Trondheim (NO); Eirik Falck Da Silva, Trondheim (NO)

(73) Assignee: Aker Carbon Capture Norway AS, Lysaker (NO)

( * ) Notice: Subject to any disclaimer, the term of this patent is extended or adjusted under 35 U.S.C. 154(b) by 0 days.

(21) Appl. No.: 18/330,012

(22) Filed: Jun. 6, 2023

(65) Prior Publication Data

US 2023/0321589 A1    Oct. 12, 2023

Related U.S. Application Data

(63) Continuation of application No. 16/690,791, filed on Nov. 21, 2019, now abandoned, which is a (Continued)

(30) Foreign Application Priority Data

Dec. 7, 2012    (NO) .................................. 20121474

(51) Int. Cl.
*B01D 53/14*    (2006.01)
*B01D 53/62*    (2006.01)
(Continued)

(52) U.S. Cl.
CPC ..... *B01D 53/1475* (2013.01); *B01D 53/1493* (2013.01); *B01D 2252/20405* (2013.01);
(Continued)

(58) Field of Classification Search
None
See application file for complete search history.

(56) References Cited

U.S. PATENT DOCUMENTS 5,618,506 A    4/1997    Suzuki et al.
6,165,433 A    12/2000   Chakravarti et al.
(Continued)

FOREIGN PATENT DOCUMENTS

BR    112015013307 A2    10/2017
CA    2893577 A1    6/2014
(Continued)

OTHER PUBLICATIONS

Burkhardt, Thortsen, "International Search Report," prepared for PCT/EP2013/075837, as mailed Apr. 14, 2014, 3 pages.
(Continued)

*Primary Examiner* — Daniel Berns
(74) *Attorney, Agent, or Firm* — Alston & Bird LLP

(57) ABSTRACT

An aqueous CO2 absorbent comprising a combination of 2-amino-2-methyl-1-propanol (AMP) and 3-aminopropanol (AP), or AMP and 4-aminobutanol (AB), is described. A method for capturing CO2 from a CO2 containing gas using the mentioned absorbent, and the use of a combination of AMP and AP, or a combination of AMP and AB are also described.

8 Claims, 10 Drawing Sheets

Related U.S. Application Data continuation of application No. 14/646,936, filed as application No. PCT/EP2013/075837 on Dec. 6, 2013, now abandoned.

(51) Int. Cl.
*B01D 53/77* (2006.01)
*B01D 53/78* (2006.01)
*B01D 53/96* (2006.01)

(52) U.S. Cl.
CPC .............. *B01D 2252/20421* (2013.01); *B01D 2252/20484* (2013.01); *B01D 2252/504* (2013.01); *B01D 2258/0283* (2013.01); *Y02C 20/40* (2020.08)

(56) References Cited

U.S. PATENT DOCUMENTS

| | | | |
|---|---|---|---|
| 2010/0105551 | A1 | 4/2010 | Kim et al. |
| 2012/0279393 | A1 | 11/2012 | Menzel et al. |
| 2015/0306538 | A1 | 10/2015 | Hoff et al. |
| 2020/0086267 | A1 | 3/2020 | Hoff et al. |

FOREIGN PATENT DOCUMENTS

| | | |
|---|---|---|
| CN | 101053751 A | 10/2007 |
| CN | 101091864 A | 12/2007 |
| CN | 101279181 A | 10/2008 |
| CN | 104853830 A | 8/2015 |
| DK | 2928583 T3 | 10/2017 |
| EP | 0558019 A2 | 9/1993 |
| EP | 2189207 A1 | 5/2010 |
| EP | 2928583 B1 | 7/2017 |
| ES | 2659002 T3 | 3/2018 |
| HR | P20171621 T1 | 12/2017 |
| IN | 327223 B | 1/2016 |
| JP | H06343858 A | 12/1994 |
| JP | H11114353 A | 4/1999 |
| JP | 2001025627 A | 1/2001 |
| JP | 2016507355 A | 3/2016 |
| JP | 6339094 B2 | 6/2018 |
| NO | 20121474 A1 | 6/2014 |
| PL | 2928583 T3 | 3/2018 |
| WO | WO2008025743 A1 | 3/2008 |
| WO | WO2010037825 | 4/2010 |
| WO | WO2010134926 A1 | 11/2010 |
| WO | WO2012038868 A1 | 3/2012 |
| WO | WO2014086988 A1 | 6/2014 |

OTHER PUBLICATIONS

Bubois, Lionel, et al.; "CO2 Absorption into Aqueous Solutions of a Polyamine, a Sterically Hindered Anime, and their Blends"; Chem. Eng. Technol., vol. 33, No. 3; 2010; pp. 461-467.

Singh, Prachi, Journal et al., "Structure and Activity Relationships for Amine Based CO2 Absorbents-I"; International Journal of Greenhouse Gas Control, vol. 1; Feb. 27, 2007; pp. 5-10.

Wang, Jia, et al.; "Determination of Total N-Nitroso Compounds by Chemical Denitrosation Using CuCl"; J. Agric. Food Chem., vol. 53; May 19, 2005; pp. 4686-4691.

Canadian Intellectual Property Office, Requisition by the Examiner received for Application No. 2893577, dated Jan. 16, 2020, 4 pages, Canada.

China National Intellectual Property Administration, Search Report received for Application No. 2013800636646, dated Jan. 15, 2016, 2 pages, China.

Henni, Amr, et al., "Reaction Kinetics of CO2 in Aqueous 1-Amino-2-Propanol, 3-Amino-1-Propanol, and Dimethylmonoethanolamine Solutions in the Temperature Range of 298-313 K Using the Stopped-Flow Technique", Industrial & Engineering Chemistry Research, Mar. 4, 2008, pp. 2213-2220, vol. 47, No. 7, ACS Publications, US.

International Preliminary Examining Authority, International Preliminary Report on Patentability, Chapter II, including Applicant's Oct. 2, 2014 response to ISA's Written Opinion, received for International Application No. PCT/EP2013/075837, dated Nov. 26, 2014, 9 pages, European Patent Office, Germany.

International Searching Authority (ISA), Written Opinion received for International Application No. PCT/EP2013/075837, 5 pages, Apr. 14, 2014, European Patent Office, Germany.

Norwegian Industrial Property Office, Search Report received for Application No. 20121474, dated Jun. 12, 2013, 13 pages, including machine translation, Norway.

Japan Patent Office, Search Report received for Application No. 2015-546036, drafting date Sep. 27, 2017, 16 pages, Japan.

United States Patent and Trademark Office, Examiner's Answer received for U.S. Appl. No. 14/646,936, dated Apr. 18, 2018, 19 pages, US.

United States Patent and Trademark Office, Final Office Action received for U.S. Appl. No. 14/646,936, dated Jul. 27, 2017, 13 pages, US.

United States Patent and Trademark Office, Final Office Action received for U.S. Appl. No. 14/646,936, dated Aug. 26, 2019, 13 pages, US.

United States Patent and Trademark Office, Non-Final Office Action received for U.S. Appl. No. 14/646,936, dated Mar. 9, 2017, 21 pages, US.

United States Patent and Trademark Office, PTAB Decision on Appeal received for U.S. Appl. No. 14/646,936, dated Jun. 21, 2019, 6 pages, US.

Erga, O., et al.; "Carbon Dioxide Recovery by Means of Aqueous Amines"; Energy Convers. Mgmt., vol. 36, No. 6-9; 1995; pp. 387-392.

Lepaumier, Hélène, et al.; "Comparison of MEA Degradation in Pilot-Scale with Lab-Scale Experiments"; Energy Procedia 4, 2011; pp. 1652-1659.

Goff, George S., et al.; "Monoethanolamine Degredation:O2 Mass Transfer Effects under CO2 Capture Conditions"; Ind. Eng. Chem. Res., vol. 43; Aug. 25, 2004; pp. 6400-6408.

AQUEOUS CO2 ABSORBENT COMPRISING 2-AMINO-2-METHYL-1-PROPANOL AND 3-AMINOPROPANOL

CROSS-REFERENCE TO RELATED APPLICATIONS

This application is a continuation of U.S. patent application Ser. No. 16/690,791, filed Nov. 21, 2019, which is a continuation of U.S. patent application Ser. No. 14/646,936, filed May 22, 2015, which is a national phase entry of International Application No. PCT/EP2013/075837, filed Dec. 6, 2013, which claims foreign priority to NO Patent Application No. 20121474 filed Dec. 7, 2012; which are incorporated herein by reference in their entirety.

TECHNICAL FIELD

The present invention relates to an improved method for capturing of $CO_2$ from a combustion gas, and to an improved amine absorbent for $CO_2$.

Background Art

Capture of $CO_2$ from a mixture of gases in an industrial scale has been known for decades, i.e. for separation of natural gas and $CO_2$ from sub terrain gas wells to give natural gas for export and $CO_2$ for return to the sub terrain structure.

The growing concern on environment and the greenhouse effect of $CO_2$ from combustion of fossil fuels has caused a growing interest in $CO_2$ capture from major points of emission of $CO_2$ such as thermal power plants, in so called Post Combustion $CO_2$ capture Even if power plants represent the largest point sources for $CO_2$ emissions, other industries like steelworks and cement plants can utilize similar technologies for $CO_2$ capture.

U.S. Pat. No. 5,618,506, and EP 0 558 019, both to The Kansai Electric Power Co., Inc., and Mitsubishi Jukogyo Kabushiki Kaisha, and the citations indicated therein, give a general background of process and absorbents for capturing of $CO_2$.

Industrial $CO_2$ capturing plants include an absorber, in which a liquid absorbent is brought into countercurrent contact with the gas to be treated. A "purified" or low $CO_2$ gas is withdrawn at the top of the absorber and is released into the atmosphere, whereas a $CO_2$ rich absorbent is withdrawn from the bottom of the absorber. The rich absorbent is regenerated in a regeneration column where the rich absorbent is stripped by countercurrent flow with steam that is generated by heating of regenerated absorbent at the bottom of the regeneration column. The regenerated absorbent is withdrawn from the bottom of the regeneration column and is recycled into the absorber. A $CO_2$ rich gas, mainly comprising steam and $CO_2$ is withdrawn from the top of the regeneration column. The $CO_2$ rich gas is treated further to remove water, and compressed before the $CO_2$ is sent for deposition or other use.

Capture of $CO_2$ is, however, an energy demanding process, as the binding of $CO_2$ to the absorbent is an exothermal reaction and the regeneration is an endothermal reaction. Accordingly, heat is lost in the absorber and heat is to be added to the regeneration column to regenerate the absorbent and release the $CO_2$. This heat demand is a major operating cost for a plant for $CO_2$ capture. A reduction of the heat requirement for regeneration of the absorbent is therefore sought to reduce the energy cost for the $CO_2$ capture.

Many different amines and combinations have been suggested as absorbents for $CO_2$, the different amines having $CO_2$ absorption capabilities, see e.g. the above-mentioned patents. Examples of suggested amines for the aqueous solutions to be used as absorbents are alkanolamines such as e.g. monoethanol amine (MEA), diethanol amine (DEA), triethanol amine (TEA), methyldiethanolamine (MDEA), diisopropanol amine (DIPA), diglycol amine (DGA), methyl monoethanol amine (MMEA), 2-amino-2-methyl-1-propanole (AMP). MEA is also commonly used as a reference absorbent in tests for possible new absorbents.

The reaction kinetics, heat demand, heat of reaction, amine equilibrium loading, degradation, stability, solubility in water and absorption capacity of the different amines are of interest when selecting a potential absorbent for industrial scale $CO_2$ capture.

Amines are also prone to degradation and are corrosive in the environment where they are used. Amines are degraded both by thermal degradation and oxidative degradation, via different mechanisms, Degradation is unwanted, both as degradation inactivates the absorbent and causes a need for make-up filling of amine into the plant, as potentially large amounts of waste products are produced, and as the long term operation will be more dependent of a reclaimer unit to recover usable amines bound to degradation products (so called Heat Stable Amine Salts).

As opposed to earlier applications of amine based absorption technology like natural gas treatment, when capturing from flue gas, the treated gas is released to the atmosphere. This implies a risk for emissions of volatile amine components or degradation products to the environment.

Amines with less degradation will therefore cause less emission of degradation products in the cleaned exhaust gas leaving the plant.

Recent developments in amine technology have revealed that reactions between NOx in the flue gas and secondary amines in the solvent may lead to formation of a group of carcinogenic compounds called nitrosamines. Secondary amines may be present as part of the solvent or formed as degradation products. Nitrosamines formation is limited by avoiding the use of secondary amines and by limiting solvent degradation.

Corrosion is of concern both as it is detrimental for important parts of the plant and may reduce the life expectancy thereof, or cause a requirement for more expensive construction elements, and as products of corrosion, such as Fe-ions, may be detrimental to the absorbent by causing higher degree of degradation.

WO2010134926A1 relates to low-volatile aqueous compositions comprising a thermally stable amine and water. A number of thermally stable amines, said to thermally stable up to 130 to 170° C., are listed. Amongst the mentioned amines are found piperazine (PZ), substituted piperazines, 2-amino-2-methyl-1-propanol (AMP), and different amino alkyl alcohols, such as 3-amino-1-propanol (AP), 4-amino-1-butanol (AB), etc. There is no indication on oxidative degradation at lower temperatures, or the effect of the amines on corrosion.

$CO_2$ Absorption into Aqueous Solutions of a Polyamine (PZEA), a Sterically Hindered Amine (AMP), and their Blends, Chemical Engineering & Technology, Volume 33, Issue 3, pages 461-467, March, 2010, describes testing of aqueous solutions of amines and mixtures of amines and the performance of the tested amine solutions in $CO_2$ capture. The use of PZEA as an activator for MEA, PMEA and MEA solutions are described.

Structure and activity relationships for amine based $CO_2$ absorbents-I, International Journal of Greenhouse Gas Control 1 (2007), page 5-10, relates to testing of $CO_2$ absorption properties of amines, such as amine alkyl alcohols, as a function of chain length. Stability of the absorbents was not discussed in this publication.

The objective of the present invention is to provide an improved absorbent and an improved method for capturing of $CO_2$ from a $CO_2$ containing gas, where the improved absorbents has improved resistance to oxidative degradation and is less corrosive to the construction materials commonly used, compared to standard absorbents. An additional objective is to provide an absorbent with low risk of nitrosamine formation. An additional objective is to provide an improved absorbent and a method for capturing $CO_2$ having a lower energy demand for regeneration of the absorbent, at the same time as acceptable reaction kinetics and absorption capacity is obtained. It is also an object to provide a method for use of the new absorbent.

SUMMARY OF INVENTION

According to a first aspect, the invention relates to an aqueous $CO_2$ absorbent comprising a combination of 2-amino-2-methyl-1-propanol (AMP) and 3-amino-1-propanol (AP), or AMP and 4-amino-1-butanol (AB).

It has surprisingly been found that a $CO_2$ absorbent comprising AMP and AP, or AMP and AB, is far less prone to oxidative degradation than other well known "standard" absorbents, such as MEA alone or MEA in combination with AMP. Additionally, the present absorbent is far less corrosive, both in laboratory tests and in a pilot plant. Liberation of ions into the absorbent caused by corrosion is known to increase the oxidative degradation of amines. Accordingly, as the present absorbent is less corrosive to the parts in the plant, less ions are liberated into the absorbent adding to the inherent resistance towards oxidative degradation for the present amine absorbent.

As the present absorbents are primary amines, the formation of nitrosamines is believed to be substantially reduced in using the present absorbents for $CO_2$ capture. Also, as the present absorbents are less prone to degradation, the formation of nitrosamines is believed to be substantially reduced in using the present absorbents for $CO_2$ capture. Additionally, the present absorbents are found to be promising candidates for industrial scale plants as measured in test for absorption rate and desorption rates, respectively, vs. $CO_2$ concentration.

According to a first embodiment the concentration of AMP is from 10 to 35% by weight and the concentration of AP or AB is from 10 to 40% by weight. The upper limit for the concentration of AMP is set due to precipitation formed upon reaction with $CO_2$ at higher concentrations of AMP in an aqueous solution. Traditionally the total concentration of solutes in an aqueous absorbent is limited to about 50% by weight to avoid too high viscosity of the solution, and due to the requirement for a certain amount of water. 50% by weight total concentration of AMP and AB or AP is, however, no absolute limit. It is, however, presently assumed that the total concentration in an operating plant will be lower than 60% by weight, such as 50% by weight or lower.

According to one embodiment, the concentration of AMP is at least 10% by weight, such as at least 20% by weight, such as at least 25% by weight, or at least 30% by weight.

The concentration of AP or AB is at least 10% by weight, such as at least 20% by weight, such as at least 25% by weight, or at least 40% by weight.

According to an embodiment, the absorbent comprises a combination of AMP and AP.

According to a second aspect, the present invention relates to a method for capturing $CO_2$ from an $CO_2$ containing gas, such as an exhaust gas from a thermal power plant or an industrial plant, where the $CO_2$ containing gas is brought in countercurrent flow to a $CO_2$ absorbent in an absorber to give a $CO_2$ depleted gas that is released into the surroundings, and a $CO_2$ rich absorbent that is collected in the bottom of the absorber, regenerated and recycled into the absorber, wherein the $CO_2$ absorbent is an absorbent as described above.

According to a third aspect, the present invention relates to a use of an aqueous solution of a combination of AMP and AP or AMP and AB as an absorbent for $CO_2$ in a method for capturing $CO_2$ from a $CO_2$ containing gas.

According to one embodiment, AMP is used in a concentration from 10 to 35% by weight, and AP or AB is used in a concentration from 10 to 40% by weight.

DETAILED DESCRIPTION OF THE INVENTION

The present invention relates to an improved amine absorbent for $CO_2$ capture and a method for capturing $CO_2$ using the improved amine absorbent.

The invention is based on mixing two different primary amines having different reaction kinetics, one being a sterically hindered amine, namely 2-amino-2-methyl-1-propanol (AMP) and the other being a monoalkanolamine, namely 3-aminopropanol (AP), or 4-aminobutanol (AB).

AMP, being a sterically hindered amine, is known to have low energy requirement for regeneration of the absorbent but the slow reaction kinetics have a negative impact in the absorber as it requires a longer contact time between the $CO_2$ containing gas and the absorbent in the absorber. As opposed to the reference amine, MEA, commonly used in 30 wt %, corresponding to a molar concentration of 5 mol/l, AMP cannot be used alone in higher concentrations than about 4 mol/l, corresponding to about 35% by weight, due to precipitation formed upon reaction with $CO_2$. This limits the absorption capacity of AMP, unless a second component is used in combination.

Figure 1:
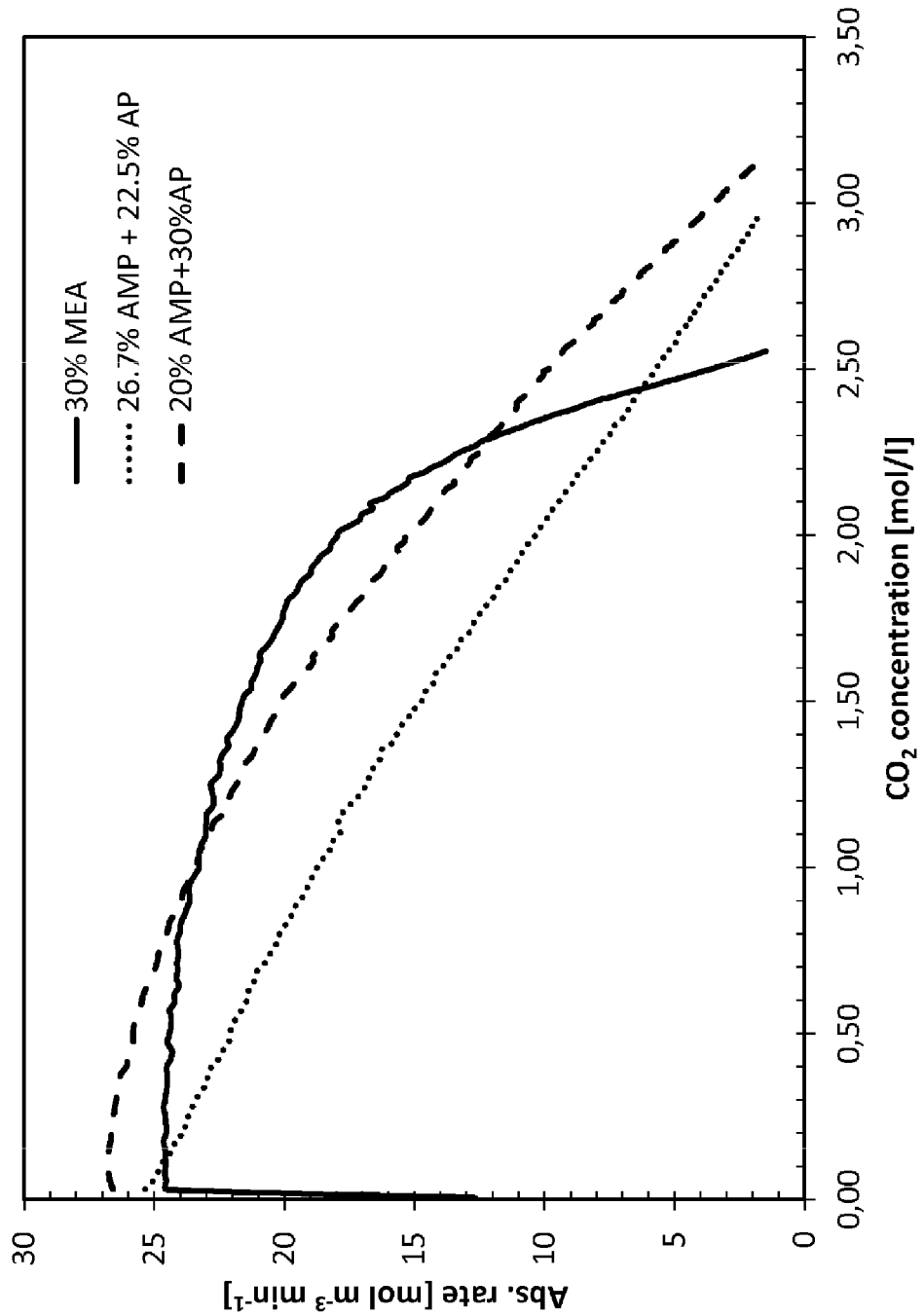
FIG. 1 is a plot of absorption rate vs. $CO_2$ concentration for a comparative absorbent and two absorbents according to the invention.
Figure 2:
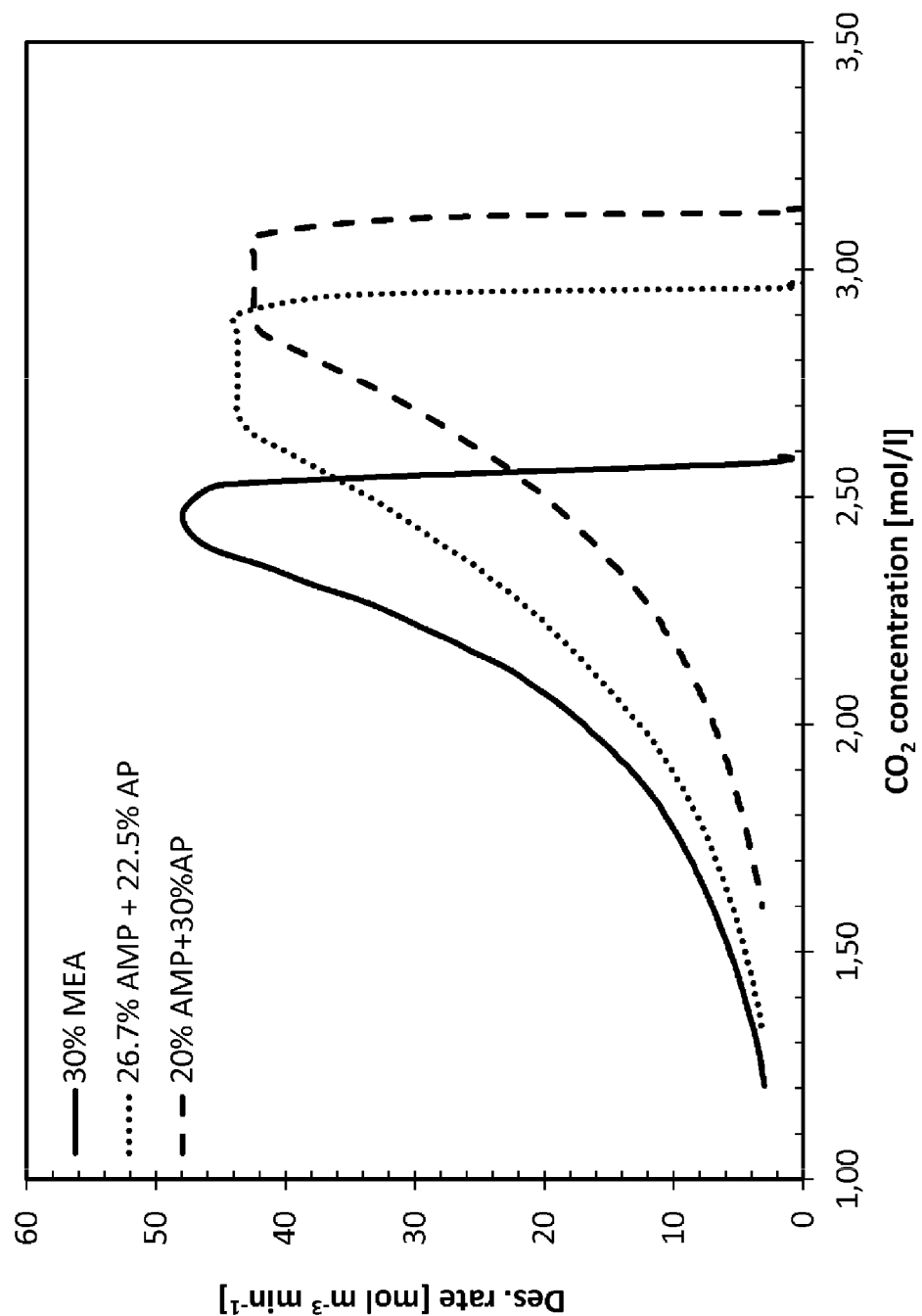
FIG. 2 is a plot of desorption rate vs. $CO_2$ concentration for a comparative absorbent and two absorbents according to the invention, FIG. 3 visualizes test of oxidative degradation of two comparative absorbents and one absorbent according to the invention, in the presence and absence of Fe ions, FIG. 4 visualizes the results from test of corrosive effect of two comparative absorbents, and one absorbent according to the invention.

AP and AB on the other side are known to have high energy requirement but faster reaction kinetics. FIGS. 1 and 2 show that AMP+AP has higher cyclic capacity and is better with regard to stripping than the industry reference MEA, which implies that A+B has lower energy requirement than MEA as an absorbent for post combustion $CO_2$ capture.

According to the present invention it is found that an aqueous $CO_2$ absorbent comprising from 10 to 35% by weight of AMP and from 10 to 40% by weight of AP or AB, are substantially less prone to thermal and oxidative degradation than the industry standard absorbent MEA. Additionally, the novel absorbent shows good reaction kinetics, absorption capacity, and low energy requirement.

It is preferred that at least 15% by weight, such as e.g. at least 20% by weight or at least 25% by weight, such as about 30% by weight, AMP is present in the absorbent. It is also preferred that at least 15% by weight, such as e.g. at least 20% by weight or at least 25% by weight such as about 30% by weight, AP or AB, is present in the absorbent.

The above mentioned concentrations of the amines corresponds to a total amine concentration of 50% in aqueous solution and a weight ratio of AMP to AP or AB from 10:40 to 35:15, such as e.g. 10:40 to 35:15, 20:30 to 30:20, 25:25. Below, different tests of examples of absorbents according to the present invention and comparative examples using MEA alone have been performed. The experimental part is divided in a first introductory part of screening experiments for a preliminary relative comparison of important characteristics of different test absorbents, such as rate of absorption, absorption capacity, cyclic capacity, viscosity and absorption equilibrium, and second part including tests run in a pilot plant.

Screening Experiments

Screening experiments were performed to get a first indication of the absorption rate and desorption rate of the candidate amine mixtures compared to 30% by weight MEA (5M) as an industry reference. The rate of absorption is a measure of the mass transfer enhancement properties of an absorbent, which is directly related to the height required for the absorber. With a faster reacting absorbent the absorber tower height can be reduced. The cyclic capacity of the solvent is the difference between the attainable $CO_2$ loading at absorption conditions and the minimum $CO_2$ loading achieved at desorption conditions. Absorption/desorption from flue gas is based upon temperature swing as the most important mechanism. Solvents with significant temperature sensitivity in their absorption capacity will have a higher cyclic capacity, thereby requiring less liquid circulation per mole $CO_2$ captured and require less energy. In the real process, desorption is typically performed at 110-130° C. The desorption screening curves, based upon increasing the temperature from 40° C. (absorption screening condition) to 80° C. gives an important relative comparison of temperature sensitivity and cyclic capacity for different solvents.

The tests were performed at an apparatus designed to give a fast relative comparison of the rate of absorption and the absorption capacity of solvents with a potential for utilization in an industrial absorption process. The method of comparison has been used for comparative studies since 1993 (see e.g. Erga et al., 1995). Being an apparatus for relative comparison, the interpretation of results relies on the specification of a base-case amine with a specific concentration.

The rate of absorption is a measure of the mass transfer enhancement properties of an absorbent, which is directly related to the height required for the absorber. With a faster reacting absorbent the tower heights can normally be reduced. The absorption capacity of the solvent is an important property as a premise for a high cyclic capacity of the process. Additional observations from the screening experiments can be made regarding the extent of foaming, possible precipitation, and discoloration upon $CO_2$ loading which may be indicative of solvent degradation. The screening tests are performed to give indications for selection of appropriate concentration levels of AMP and AP.

Different concentrations of AP/AMP were tested, and compared with 5M (30% by weight) MEA. The reproducibility has been controlled by reproducing the 30% MEA test.

The absorption capacity of the solvent is an important premise for maximizing the cyclic capacity of the process. With MEA and AP the capacity for absorption is limited by the reaction stoichiometry to about 0.5 mole $CO_2$/mole amine at ambient pressure. As AMP is a sterically hindered amine and forms bicarbonate, it can be loaded to more than 0.5 mole $CO_2$/mole amine depending of the $CO_2$ partial pressure with a theoretical maximum loading of 1.0. It must, however, be noted that for the cyclic capacity to be high with AMP, a high $CO_2$ equilibrium pressure at absorption conditions is also necessary.

The mass transfer screening apparatus is used to measure the absorption rate of $CO_2$ at 40° C. followed by desorption rate measurements with nitrogen at 80° C. The gas is distributed through the diffuser of sintered glass which creates gas-bubbles rising up through the liquid. From the surface of these bubbles, $CO_2$ is first absorbed into the liquid at 40° C. until 95% of equilibrium, corresponding to 9.5% $CO_2$ in the effluent gas, is obtained. Afterwards the rich solution is heated to 80° C., and desorption starts with pure nitrogen until the $CO_2$ concentration in the effluent gas decreases to 1 vol %. A computer controls the solenoid valve system for gas supply and cooling or heating of the water bath.

The $CO_2$-content of the effluent gas is measured by an IR $CO_2$ analyzer. After each experiment the accumulated weight of liquid is measured and compared with the net absorbed amount of $CO_2$. This is to assure that no solvent is lost by evaporation. Samples of the solvent are also taken for $CO_2$ analysis after the absorption and desorption sequence.

Results for AMP, and AMP+AP

FIG. 1 illustrates the results for absorption rate vs. $CO_2$ concentration obtained with the following alkanolamine concentrations in aqueous solvent of 20% by weight solution of AMP+30% by weight of AP, 26.7% by weight of AMP+22.5% by weight of AP and 30% by weight of MEA, whereas FIG. 2 illustrates the desorption rate vs. $CO_2$ concentration for the same absorbents.

FIG. 1 shows that the 20% by weight of AMP+30% by weight of AP amine solution has an absorption rate comparable to MEA, and higher capacity. The 26.7% by weight of AMP+22.5% by weight of AP, has both lower absorption rate and lower capacity than MEA but is still a promising candidate as an absorbent.

FIG. 2 indicates that both the amine solutions comprising AMP+AP has higher net $CO_2$ capacity than MEA alone. Accordingly both the AMP+AP solutions are promising as $CO_2$ absorbents.

Oxidative Degradation

Oxidative degradation experiments were done by sparging a reaction gas containing air and $CO_2$ through a glass sinter into an amine solution preloaded with $CO_2$ in a glass reaction vessel. The gas flow rate and the composition of the reaction gas are controlled by the mass flow controllers (MFC). The reaction vessel has a thermostatic jacket which is connected to a water bath in order to obtain a constant temperature of 55° C. At the top of the reaction vessel two 400 mm intensive condensers are connected which are cooled with tap water. After the condensers the gas is led through a gas washing bottle before it is going to a vented fume hood. Experiments are run for approximately 500 hrs and samples are taken for amine analysis on regularly intervals. The difference between the start and end concentration of amine gives a measure of the amine degradation.

Figure 3:
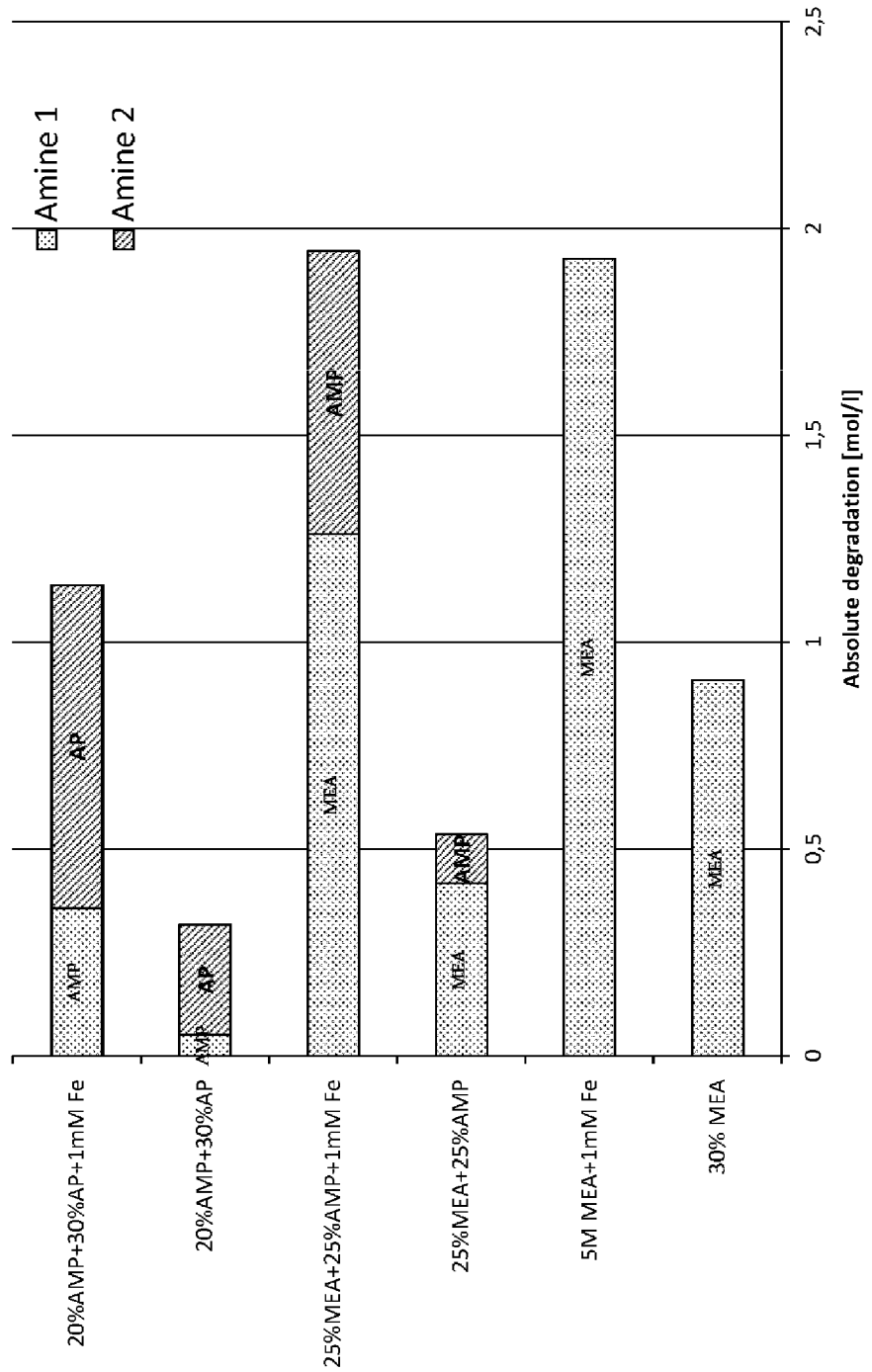

FIG. 3 illustrates the oxidative degradation of three different amine absorbents for $CO_2$, in the absence and in the presence of Fe ions. The three different amine solutions where 20% by weight AMP+30% by weight AP (an absorbent according to the present invention), 25% by weight MEA+25% by weight AMP, and 30% by weight MEA.

The results visualized in figure indicates that the absorbent according to the present invention, i.e. the 20% by weight AMP+30% by weight AP shows a substantially improved resistance to degradation than the absorbents comprising MEA+AMP or MEA alone, both in the absence and presence of Fe ions in the solution.

The tests including Fe ions illustrate how the rate of degradation may be influenced by Fe ions resulting from corrosion of ferrous materials in the plant. It is clear that Fe ions increases the degradation for all the absorbents tested.

Corrosive Effect of Absorbents

Experiments on the corrosive effect of the $CO_2$-amines-water system were performed using stainless steel cells (316SS, OD=½", thickness=1.7 mm). Each cell had a volume of about 27 $cm^3$ and is equipped by a Swagalok valve. A set of experiment consisted of 5 cells. Each cell was flushed with $N_2$ (99.999%) to purge air within the cell. A certain amount of $CO_2$-loaded amine solution (~15 $cm^3$) was then injected into the cell and the top of the cell was flushed with $N_2$ before closing the valve to ensure that there is no air within the cell. The cells were then placed in a forced convection oven at 135° C. for 5 weeks. One cell was taken every week for analysis of metals by inductively coupled plasma mass spectroscopy (ICP-MS).

Figure 4:
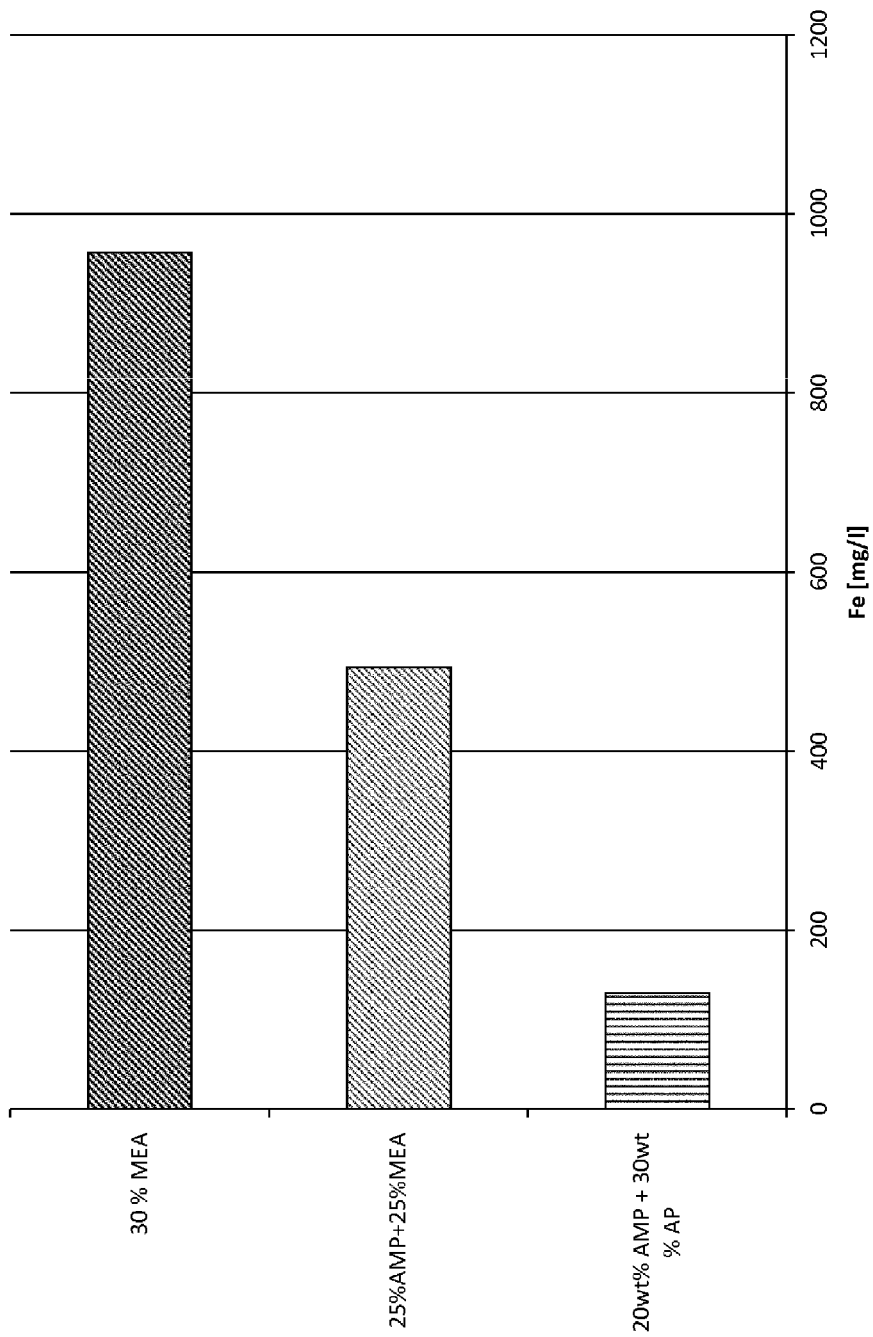

FIG. 4 illustrates the corrosive effect of different aqueous amine $CO_2$ absorbents, measured according to the above-described procedure. The concentration of Fe ions in the amine solution after the test period is a clear indication on the corrosive effect of the amine solution in a standardized test.

The results illustrated in FIG. 4 clearly indicate that the absorbent according to the present invention is far less corrosive than MEA+AMP or MEA alone.

By combining the results for oxidative degradation in the presence and absence of Fe ions and the corrosive effect of the tested amine absorbents, it is highly likely that the absorbent according to the present invention will be far less prone to oxidative degradation in a $CO_2$ capture plant due to two different effects. Firstly, the present absorbent shows lower degradation rate than the comparative absorbents, both in the presence and absence of Fe ions in an oxidative degradation under standardized conditions and concentration of Fe ions. Secondly, the corrosive effect of the present absorbent is substantially lower than for the comparative absorbents. This means that the concentration of Fe ions in the absorbent circulating in a plant will remain low for a longer period, and the concentration of Fe ions will most probably remain lower during the lifetime of the plant, by using the present absorbent. This is an indication that the degradation of the present absorbent will be substantially lower than the comparative absorbents in a $CO_2$ capture plant.

Tests on a Pilot Plant

Figure 5:
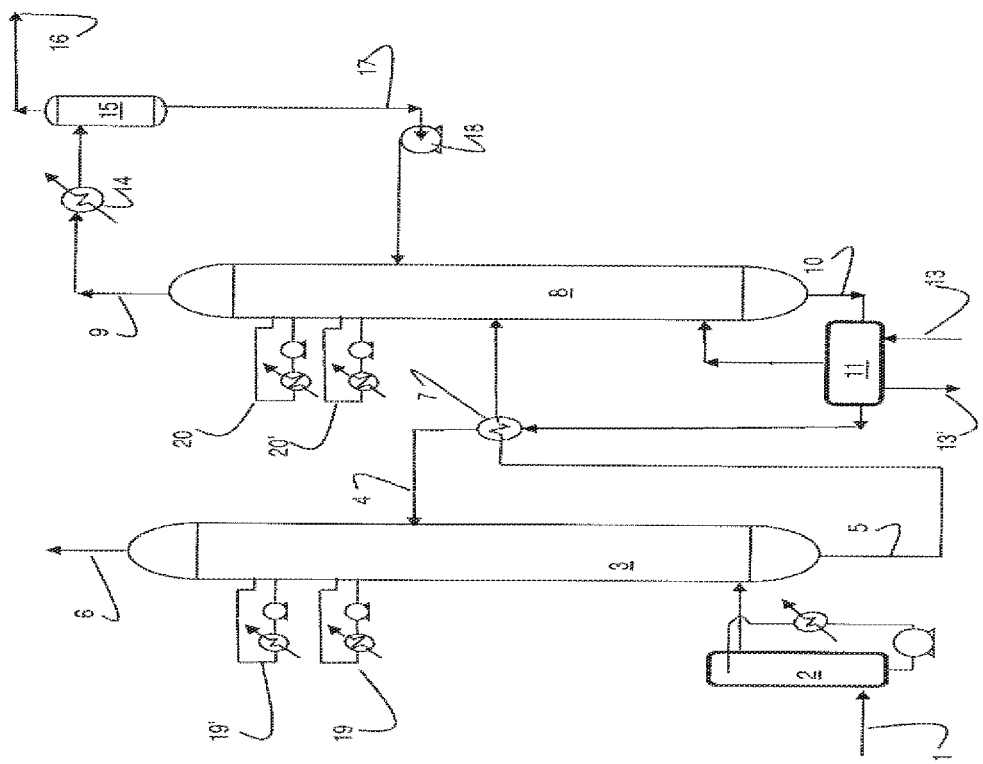
FIG. 5 is a principle sketch of a pilot plant used for testing, FIG. 6 visualizes results for corrosion as concentration of Fe ions in the absorbents in a pilot plant as a function of hours of operation.

A test campaign was performed in a small pilot plant for Post Combustion $CO_2$ absorption as illustrated in FIG. 5. Exhaust gas, generated by means of a propane burner which can be adapted to natural gas or coal derived flue gas by mixing with air or recycling of $CO_2$, respectively, is introduced through an exhaust pipe 1. The exhaust gas in the exhaust pipe is introduced into a direct contact cooler 2 where the exhaust gas is washed and humidified by countercurrent flow to water. The cooled and humidified exhaust gas is then introduced into an absorber, where the exhaust gas is brought in countercurrent flow to an aqueous absorbent introduced through a lean amine pipe 4, in a not shown packing. Rich absorbent having absorbed $CO_2$ is collected at the bottom of the absorber and is withdrawn trough a rich absorbent pipe 5, whereas the $CO_2$ lean exhaust gas is released into the surroundings through lean exhaust pipe 6 after being washed in washing sections by means of water recycled through washing water cooling circuits 19, 19'.

The rich absorbent in pipe 5 is heated against the lean absorbent in line 4 by means of a heat exchanger 7 before being introduced into a regeneration column 8 where the rich absorbent is stripped by countercurrent flow to steam. The stripping steam is generated in a reboiler 11 in which lean absorbent collected at the bottom of the regeneration column is introduced through a lean absorbent withdrawal pipe 10. Heat for steam production in the reboiler is added by means of steam introduced in steam pipe 13, the steam in pipe 13 is condensed in the reboiler and is withdrawn through condensate pipe 13'.

Lean absorbent is withdrawn from the reboiler 11 in lean absorbent pipe 4 and recycled into toe absorber. Steam and $CO_2$ liberated from the absorbent in the regeneration column is washed in not shown washing sections by countercurrent flow to water recirculating in washing water cooling circuits 20, 201, before being withdrawn through $CO_2$ collection pipe 9. The $CO_2$ and steam is cooled in a cooler 14, flashed in a flash drum 15 to give water that is recycled into the regeneration column 8 through a recycling line 17 via a pump 18, and partly dried $CO_2$ that is withdrawn through a pipe 16 for further treatment.

The pilot has an absorber packing height of 19.5 m, a desorber height of 13.6 m and is well equipped with sampling ports for gas and liquid, temperature and pressure probes and measurements of gas/liquid flow in all parts of the plant.

Figure 6:
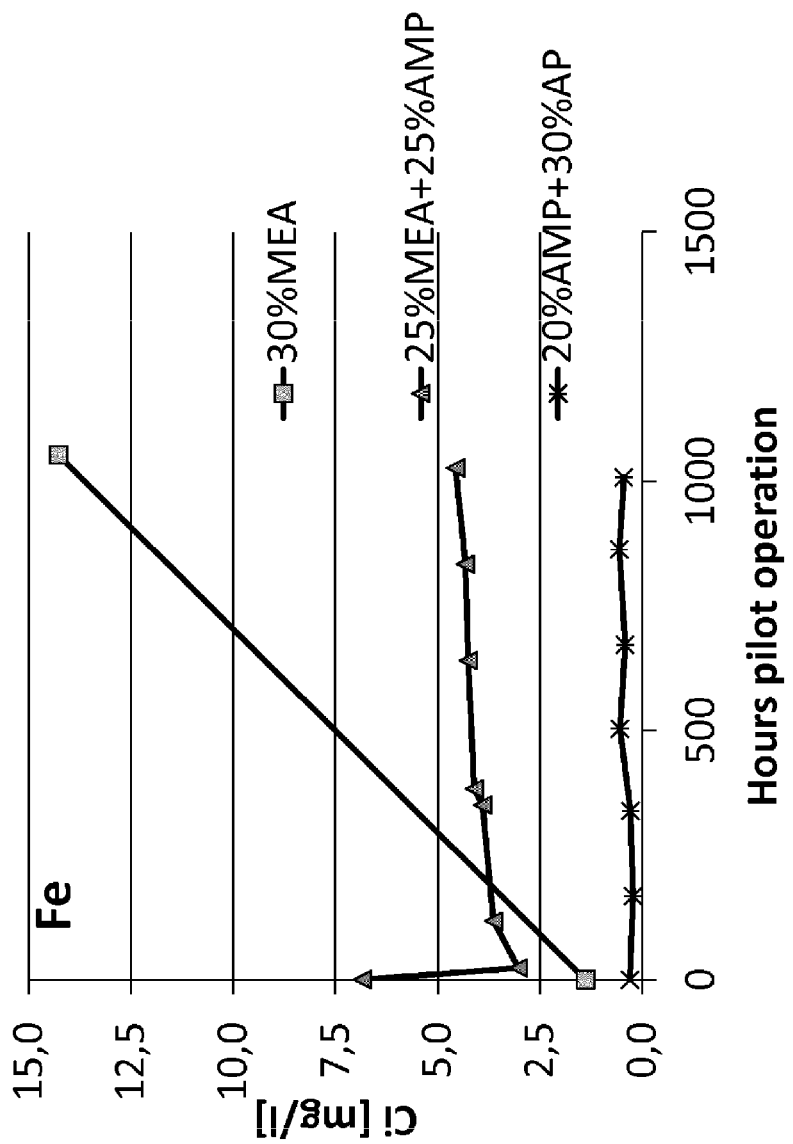
Figure 7:
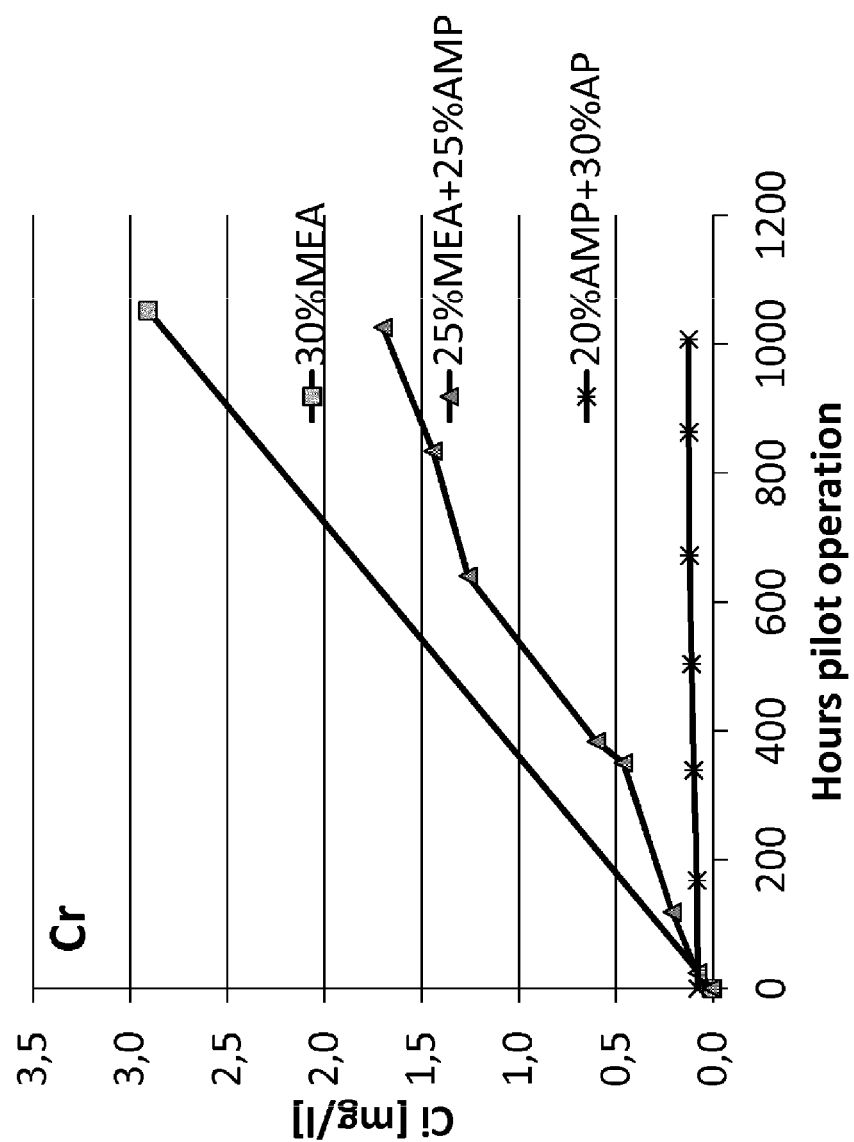
FIG. 7 visualizes results for corrosion as concentration of Cr ions in the absorbents in a pilot plant as a function of hours of operation, FIG. 8 visualizes results for corrosion as concentration of Ni ions in the absorbents in a pilot plant as a function of hours of operation, FIG. 9 visualizes results for relative degradation for different amines after 1000 hours of use in a pilot plant, and FIG. 10 visualizes the results for formation of nitrosamines after 1000 hours of use in a pilot plant.
Figure 8:
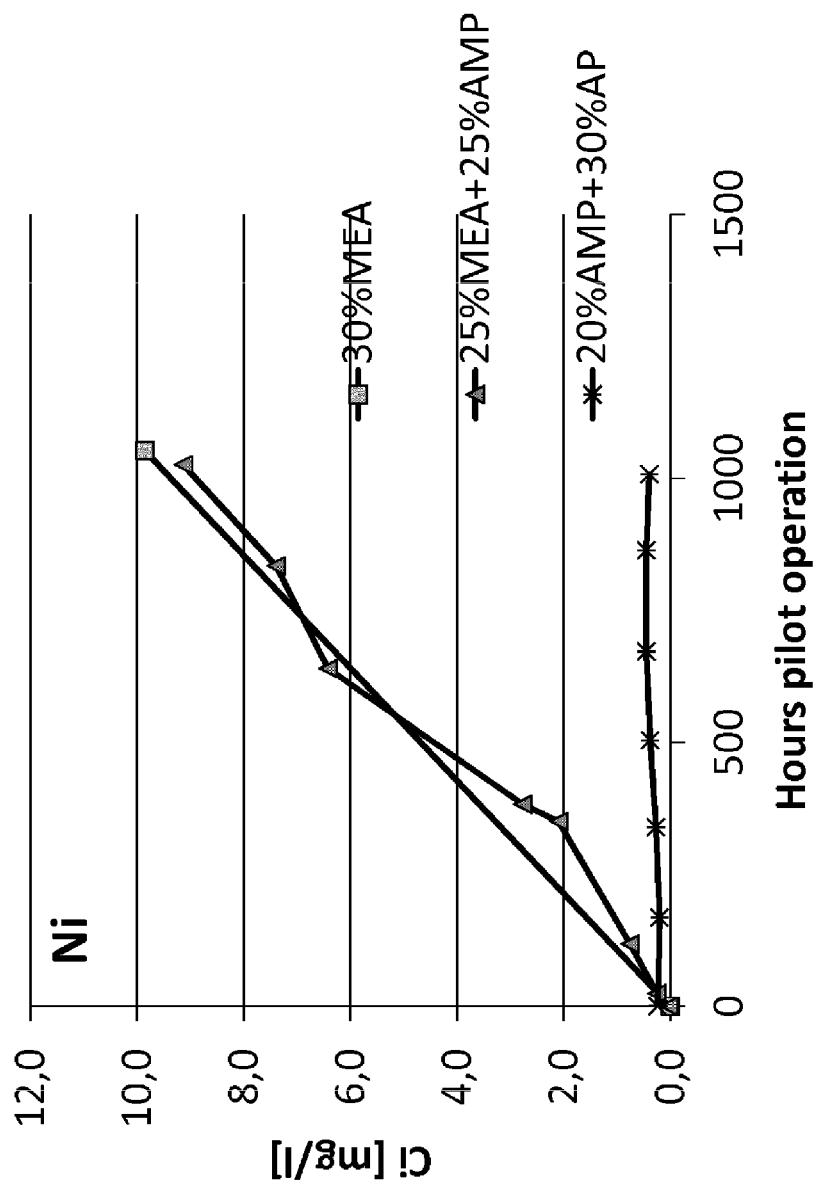

Test samples were withdrawn at times indicated in FIGS. 6, 7, 8, from the absorbent circulating in the pilot plant and the test samples were tested for concentration of Fe, Ni, and Cr ions, as being indicative of corrosive effect of the tested amine absorbents.

FIGS. 6, 7, 8 illustrate the concentration of Fe, Ni and Cr ions, respectively, in the amine absorbent during 1000 hours pilot plant operation. The test results clearly indicate that the amine absorbent according to the present invention, 20% by weight AMP+30% by weight AP, is far less corrosive than the comparative absorbents 25% by weight MEA+ and 25% by weight AMP or 30% by weight MEA alone.

Figure 9:
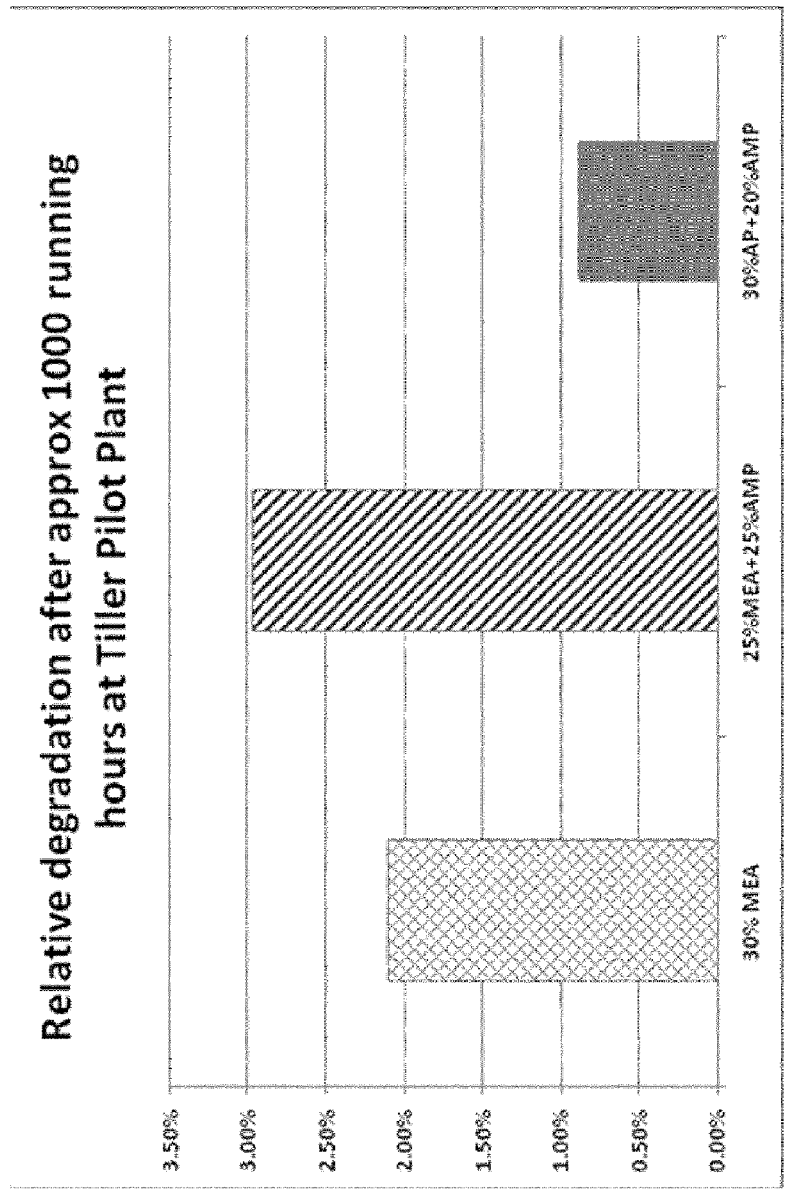

FIG. 9 illustrates the relative degradation of amine after 1000 hours operation at the pilot plant for 30% by weight MEA, 25% by weight MEA+25% by weight AMP and 30% by weight AP+20% by weight AMP.

Formation of nitrosamines is an indication of amine degradation as mentioned in the introduction. Tests were performed for determination of nitrosamine formation during operation of the pilot plant operated as indicated for the pilot plant tests above. Test samples were withdrawn at times indicated in FIG. 10 and were analyzed for total nitrosamines by head space GC-MS-NCD as released NO after treatment with HCl and CuCl at 70° C. The method is a modified version of the method described by Wang J. et al. in J. Agric. Food Chem, 2005, 53, 4686-4691. The main instrumental modification is that GC-MS-NCD is used instead of the Sievers Nitric Oxide Analyser.

Figure 10:
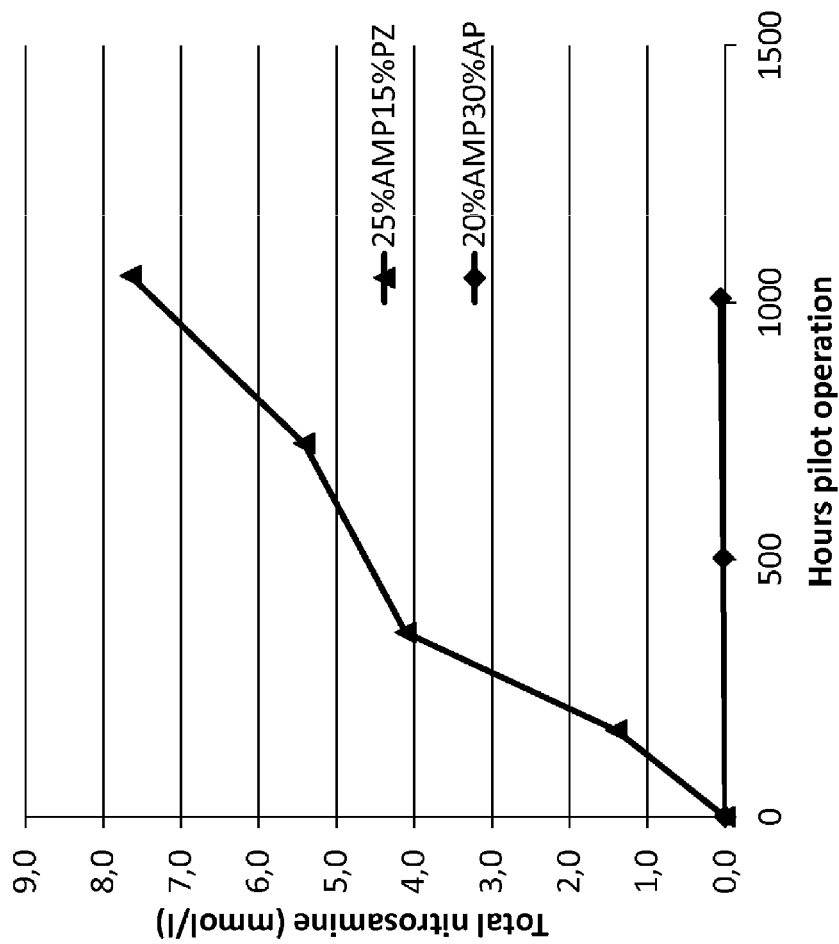

FIG. 10 shows the development in concentration of total nitrosamines in the amine absorbent during approx. 1000 hours of pilot plant operation. The test results clearly illustrate that nitrosamine formation in the amine absorbent according to the present invention, 20% by weight AMP+ 30% by weight AP, is significantly reduced compared to amine absorbent containing secondary amine such as 25% by weight AMP+15% by weight PZ.

The test results visualized in FIGS. 6, 7, 8, 9, 10 confirms that the present aqueous amine absorbents have beneficial effects with regard to corrosive effect on steel, and are less prone to degradation, primarily oxidative degradation than the comparative absorbents tested.

All the results from the pilot plant operation indicates that the presently claimed amine absorbent is substantially less corrosive and is degraded to a lower degree than the comparative amine absorbents according to the prior art.

The invention claimed is:

1. An aqueous $CO_2$ absorbent comprising a combination of 2-amino-2-methyl-1-propanol (AMP) and 3-aminopropanol (AP).

2. The absorbent according to claim 1, wherein the absorbent additionally comprises any conventional additive.

3. The $CO_2$ absorbent according to claim 1, wherein the concentration of AMP is from 10 to 35% by weight and the concentration of AP is from 10 to 40% by weight.

4. The $CO_2$ absorbent according to claim 3, wherein the concentration of AMP is from 20 to 30% by weight.

5. The absorbent according to claim 3, wherein the concentration of AP is from 20 to 30% by weight.

6. A method for capturing $CO_2$ from an $CO_2$ containing gas, where the $CO_2$ containing gas is brought in countercurrent flow to a $CO_2$ absorbent in an absorber to give a $CO_2$ depleted gas that is released into the surroundings, and a $CO_2$ rich absorbent that is collected in the bottom of the absorber, regenerated and recycled into the absorber, wherein the $CO_2$ absorbent is an aqueous $CO_2$ absorbent comprising a combination of 2-amino-2-methyl-1-propanol (AMP) and 3-aminopropanol (AP).

7. A method of using an aqueous solution of a combination of AMP and AP as an absorbent for $CO_2$ in a method for capturing $CO_2$ from a $CO_2$ containing gas, said method comprising contacting the $CO_2$ containing gas with the aqueous solution.

8. The method of claim 7, where AMP is used in a concentration from 10 to 35% by weight, and AP is used in a concentration from 10 to 40% by weight.

* * * * *